(12) United States Patent
Copley et al.

(10) Patent No.: US 11,762,807 B2
(45) Date of Patent: Sep. 19, 2023

(54) METHOD AND APPARATUS FOR DETERMINISTICALLY IDENTIFYING SETS OF SNAPSHOTS ON A STORAGE SYSTEM

(71) Applicant: EMC IP HOLDING COMPANY LLC, Hopkinton, MA (US)

(72) Inventors: John Copley, Hopkinton, MA (US); Daryl Kinney, Hopkinton, MA (US); Tao Tao, Cambridge, MA (US); Shakil Anwar, Westborough, MA (US); Michael Ferrari, Douglas, MA (US); Nicholas von Hein, Riverside, RI (US)

(73) Assignee: Dell Products, L.P., Hopkinton, MA (US)

( * ) Notice: Subject to any disclaimer, the term of this patent is extended or adjusted under 35 U.S.C. 154(b) by 144 days.

(21) Appl. No.: 17/154,332

(22) Filed: Jan. 21, 2021

(65) Prior Publication Data
US 2022/0229806 A1 Jul. 21, 2022

(51) Int. Cl.
G06F 16/11 (2019.01)
G06F 16/14 (2019.01)

(52) U.S. Cl.
CPC ............ *G06F 16/128* (2019.01); *G06F 16/14* (2019.01)

(58) Field of Classification Search
CPC ............................... G06F 16/128; G06F 16/14
USPC ......................................................... 707/609
See application file for complete search history.

(56) References Cited

U.S. PATENT DOCUMENTS

| | | | | |
|---|---|---|---|---|
| 9,417,815 B1* | 8/2016 | Elisha | ................ | G06F 11/1456 |
| 10,365,978 B1* | 7/2019 | Whitney | ............ | G06F 11/1464 |
| 10,536,288 B1 | 1/2020 | Leblang et al. | | |
| 2007/0179994 A1* | 8/2007 | Deguchi | ............ | G06F 11/1469 |
| 2009/0228670 A1* | 9/2009 | Nakagawa | .......... | G06F 11/1662 |
| | | | | 711/E12.001 |
| 2010/0023716 A1* | 1/2010 | Nemoto | ............. | G06F 11/1451 |
| | | | | 711/E12.103 |
| 2015/0286695 A1* | 10/2015 | Kadayam | ............ | G06F 16/2365 |
| | | | | 707/639 |
| 2018/0145983 A1* | 5/2018 | Bestler | ..................... | H04L 63/08 |
| 2018/0181311 A1* | 6/2018 | Elisha | ..................... | G06F 3/065 |
| 2019/0332499 A1* | 10/2019 | Huang | ................. | G06F 3/0689 |
| 2020/0012568 A1* | 1/2020 | Vig | ..................... | G06F 11/2094 |
| 2020/0250136 A1* | 8/2020 | Ballal | ................. | G06F 16/185 |
| 2020/0310915 A1* | 10/2020 | Alluboyina | ......... | G06F 11/1469 |
| 2020/0333973 A1* | 10/2020 | Yu | ......................... | G06F 16/128 |

(Continued)

FOREIGN PATENT DOCUMENTS

CA 3025225 A1 * 5/2020 ........... G06F 16/128

*Primary Examiner* — Phuong Thao Cao
(74) *Attorney, Agent, or Firm* — Anderson Gorecki LLP

(57) ABSTRACT

Snapsets containing snapshots from a group of storage volumes are assigned snapset IDs. The same snapset ID is applied to each snapshot of the snapset, and is a globally unique value within the storage system. The snapset ID is assigned to a snapshot upon creation, and remains the same regardless of creation or deletion of other snapshots on the storage volume. By assigning a snapset ID to each snapshot of the snapset, and maintaining the snapset ID as a constant value as long as the snapshot is maintained on the storage system, it is possible to easily determine which snapshots form a given snapset. Control operations on particular storage groups or across storage groups are implemented by specifying particular actions to be taken on snapsets or snapshots, which are identified using the snapset IDs.

20 Claims, 9 Drawing Sheets

(56) References Cited

U.S. PATENT DOCUMENTS

2021/0103499 A1* 4/2021 Alluboyina ............. G06F 3/067
2021/0103555 A1* 4/2021 Kaplingat ........... G06F 16/1734

* cited by examiner

METHOD AND APPARATUS FOR DETERMINISTICALLY IDENTIFYING SETS OF SNAPSHOTS ON A STORAGE SYSTEM

FIELD

This disclosure relates to computing systems and related devices and methods, and, more particularly, to a method and apparatus for deterministically identifying sets of snapshots on a storage system.

BACKGROUND

Storage systems maintain storage volumes for use by applications executing on host computers. A given application may use multiple storage volumes to store different types of data. For example, an application may use a first storage volume to store information associated with a database, and a second storage volume to store logs identifying changes that have been made to the database. Accordingly, it is common to form groups of storage volumes, referred to herein as a storage groups, which are collectively designed to store data for a given application or set of applications.

The growth of data being stored increases the importance of data-protection and recovery options. Likewise, the high frequency of online transactions magnifies the implications of an outage. During a data-availability issue due to accidental or malicious activity, the ability to quickly and surgically recover from data loss is critical. To enable this, it is important for applications to be able to recover from a large selection of granular, point-in-time images. Accordingly, storage systems have developed the ability to take point-in-time images of storage volumes of storage groups. A point-in-time image of a storage volume is referred to herein as a snapshot. A set of snapshots of the storage volumes of a storage group, that are taken at the same time, is referred to herein as a snapset.

Conventionally, each storage volume of the storage group would be named, and the snapshots would be identified using this same storage volume name. Multiple snapshots on the storage volume, taken at different points in time, would be differentiated from each other using a generation number. The newest snapshot on a given storage volume would be identified using generation number 0, and each older snapshot would have a higher generation number. For example, if there were four snapshots of a given storage volume, the snapshots would have generation number #0 (most recent), generation #1, #2, and #3, with the snapshot having generation #3 being the oldest snapshot of that particular storage volume. When a new snapshot of the storage volume was created, it would be assigned generation number zero, and the snapshot generation number each of the other snapshots of that storage volume would be incremented.

Unfortunately, identifying the snapshots by storage volume name and generation number could be non-deterministic. For example, there was always a possibility that a user would accidentally work with a snapshot on a storage volume that they did not intend to use. One reason for this is due to the renaming of the generation numbers when newer snapshots are created. For example, as noted above, if the storage system initially contained a single snapshot of a storage volume, that single snapshot would be given generation number 0. If a new snapshot of the storage volume was created, the new snapshot would be assigned generation number 0, and the generation number of the previous snapshot would be changed to generation number 1. This can engender confusion, such that a user may inadvertently work with an incorrect snapshot.

Additionally, it is possible for storage volumes to be added to a storage group and for users to manually instruct the storage system to take a snapshot of an individual storage volume rather than creating an entire snapset. Accordingly, the set of snapshots of storage volumes that form a snapset on the storage group might not all have the same generation number. Thus, if a user is looking to remove all snapshots associated with a given snapset, it may be difficult to keep track of which snapshots are associated with the snapset.

In an environment where snapshots and snapsets are being created using a manual process, the use of snapshot name and generation number was feasible. However, more recently storage systems have advanced and are now able to apply snapshot policies on sets of storage volumes (storage groups) such that the snapshot subsystem of the storage system is able to automatically create snapshots on a periodic basis. For example, for an important storage group that is experiencing a high volume of IO activity, such as a banking database or a database associated with on-line transaction processing, it may be desirable to create snapsets on the storage volumes of the storage group every several minutes. Using a snapshot name and generation number in this environment makes it extremely difficult for the user to manually take any action on the snapshots, since before the user is able to implement any changes the generation numbers of the various snapshots are likely to have changed. Accordingly, it would be beneficial to provide a method and apparatus for deterministically identifying sets of snapshots on a storage system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

A snapset is a set of consistent snapshots that are taken together across a group of storage volumes as the data contained in the storage volumes existed at a particular point in time. For example, when a snapset is taken on a storage group that contains 10 storage volumes, the resulting snapset includes of 10 consistent snapshots that are all taken on the storage group without having any additional Input/Output (IO) operations occur on the storage group. While creation of a snapset may take a finite amount of time, for convenience this disclosure will refer to a snapset as being created "at a particular point in time," which refers to the time where IO operations on the storage group are paused to enable creation of the snapset on the storage volumes.

As discussed in greater detail herein, in some embodiments a snapset ID is assigned to a snapshot upon creation, and this same snapset ID is associated with each snapshot of the snapset. The snapset ID is an absolute value that remains the same regardless of creation or deletion of other snapshots on the storage volume. The snapset ID is also globally unique within the storage system. When a snapset is taken on a storage group, the snapshots that are created on the individual storage volumes in the snapset are all assigned the same snapset ID.

Optionally, the storage system may also assign a generation ID to the snapshots, which is a number of the snapshot relative to the number of snapshots at the time the snapshots are viewed. Use of a generation number enables backward compatibility for users that are accustomed to managing snapshots using snapshot name and generation number. However, by also assigning a snapset ID to each snapshot of the snapset, and maintaining the snapset ID as a constant value as long as the snapshot is maintained on the storage system, it is possible to easily determine which snapshots form part of a given snapset. Thus, if the user would like to take action on a particular snapset, for examine to delete all snapshots associated with a given snapset or to delete all snapshots associated with all snapsets older than a particular age, it is possible to easily identify the correct sets of snapshots on the storage system using the snapset IDs.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
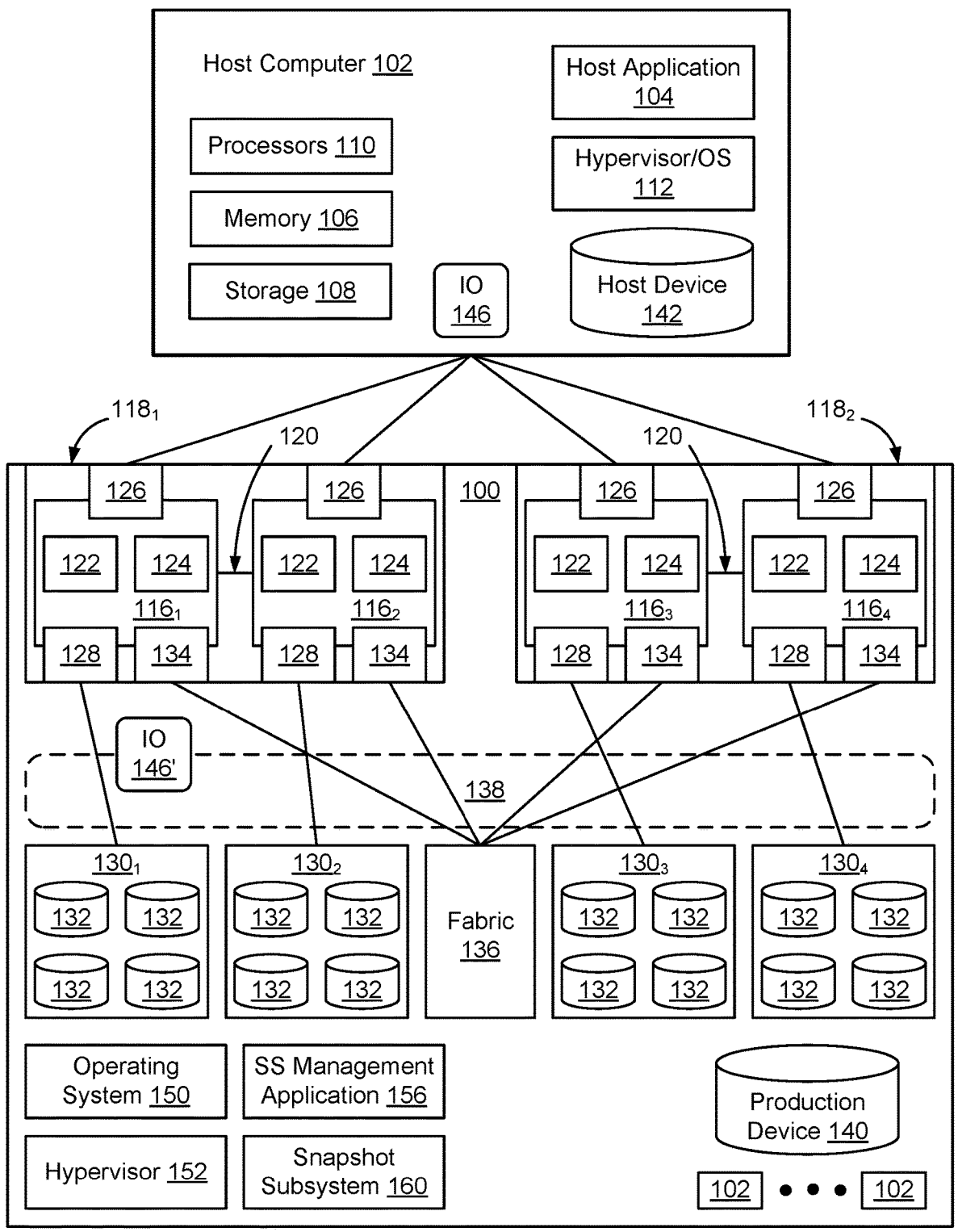
FIG. 1 is a functional block diagram of a host connected to a storage system, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. Once the volume of data is linked to a logical storage volume and presented to the host computer 104 as a host device 142, the host computer 102 can execute read/write IOs on the TDev to access the data of storage volume.

As shown in FIG. 1, in some embodiments the storage system 100 has an operating system 150, and one or more system applications. Example system applications shown in FIG. 1 include a hypervisor 152, a storage system management application 156, and a snapshot subsystem 160. Each of these components is described in greater detail below. The interrelationship between several of these components is also shown in greater detail in FIG. 2.

In some embodiments, operating system 150 is an embedded operating system of the storage system 100. An example operating system 150 may be based on Linux, although other operating systems may also be used. The hypervisor 152 is used to abstract the physical resources of the storage system, to enable at least some of the system applications to execute in emulations (e.g. virtual machines) on the storage system. For example, host 102 may execute in an emulation on storage system 100.

Figure 2:
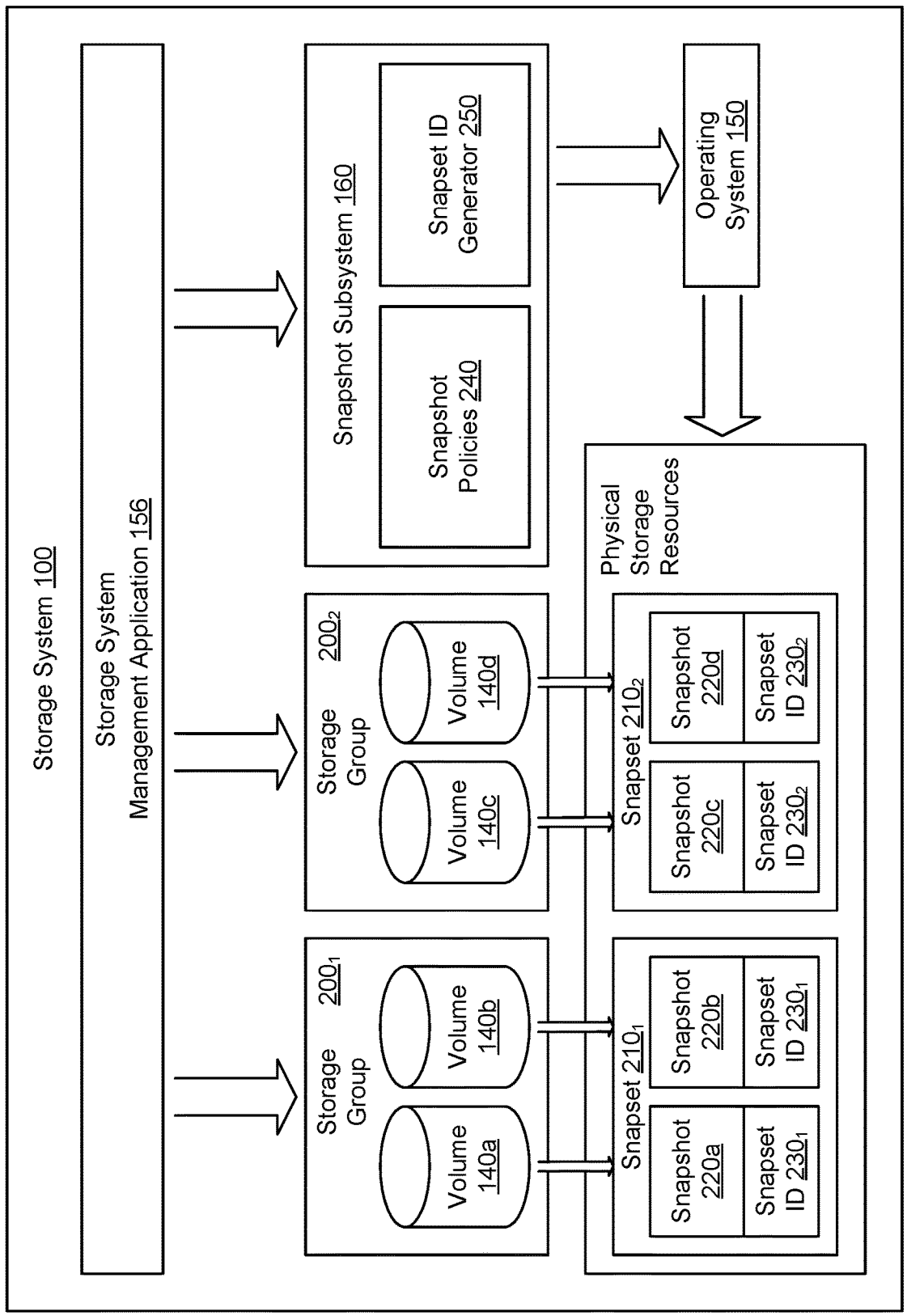
FIG. 2 is a functional block diagram of an example storage system including a snapshot subsystem having a snapshot ID generator, according to some embodiments.

In some embodiments, the storage system 100 includes a storage system management application 156 implemented as an application executing in a container in the storage system 100. A user interacts with the storage system management application 156 via a GUI (Graphical User Interface) or through a command line interface, and uses the storage system management application 156 to configure operation of the storage system 100. For example, the user could interact with the storage system management application 156 to create individual snapshots on particular storage volumes, create individual snapsets, set snapshot policies on storage groups, delete snapshots or snapsets on the storage system, and otherwise control operation of the storage system. Although FIG. 2 shows the storage system management application included in storage system 100, in some embodiments, the storage system management application may be implemented external to storage system 100, for example as a host application 104 executing on host 102.

Snapshot subsystem 160, in some embodiments, is configured to create snapshots of storage volumes. A "snapshot," as that term is used herein, is a copy of a volume of data as that volume existed at a particular point in time. A snapshot of a storage volume 140, accordingly, is a copy of the data stored on the storage volume 140 as the data existed at the point in time when the snapshot was created. A snapshot can be either target-less (not linked to a TDev) or may be linked to a target TDev when created. When a snapshot of a storage volume is created, the snapshot may include all of the data of the storage volume, or only the changes to the storage volume that have occurred since the previous snapshot was taken.

A snapset, as that term is used herein, is a set of snapshots that are taken on storage volumes of a storage group, that are taken based on data that existed in the storage volumes at a particular point in time. To create a snapset, IO operations on the storage volumes of a storage group are stopped, and a snapshot of each storage volume of the storage group is created. Once all of the snapshots have been created, the snapset is complete, and IOs on the storage volumes of the storage group may resume.

If a storage group has numerous storage volumes, it can take a finite amount of time to process creation of a snapset. However, since IO operations on the storage group are quiesced during creation of the snapset, for convenience and ease of explanation, this description will refer to a snapset as being created "at a particular point in time", even though snapshots of the snapset may be actually be created at different times during the quiescence time interval.

By creating a snapset containing a set of snapshots of storage volumes as the data existed at a particular point in time, it is possible to create a consistent view of the set of storage volumes to create a consistent recovery point for an application 104. If one or more of the original storage volumes is corrupted, lost, or inaccessible, the snapshot copy of the data may be used to resume operations with the data.

FIG. 2 is a functional block diagram of an example storage system 100 including a snapshot subsystem 160 having a snapshot ID generator 250, according to some embodiments. As shown in FIG. 2, in some embodiments a user will set snapshot policies 240 on individual storage volumes 140, and on sets of storage volumes 140 referred to herein as storage groups 200. The snapshot policies 240 define the frequency of creation of the snapshots, the retention period of the snapshots, and optionally a cloud provider where the snapshots are to be stored. The frequency tells the snapshot subsystem 160 in the storage system 100 to create a snapshot 220 against a particular storage volume 140 or against all of the storage volumes 140 in the storage group 200 at a regular cadence, as defined by the user. The retention period defines the age of the snapshot 220 when it should be deleted. If a cloud provider is specified, this parameter tells the storage system 100 the identity of a cloud-based object repository (cloud provider) where the snapshots need to be shipped, so that the snapshots 220 are not required to be stored using the storage resources 130 of the storage system 100.

Snapshot policies 240 can be customized with rules that specify when to take snapshots, how many snapshots to take, and how long to keep each snapshot. A given storage group can be protected by multiple snapshot policies 240 with differing schedules and retention parameters, according to the requirements of the business. Snapshot policies 240 can also be applied to multiple storage groups 200. Administrators can also manually take snapshots 220 of storage volumes 140 or storage groups 200 on demand.

As shown in FIG. 2, storage system 100 maintains storage volumes 140, for example for use by applications 104 executing on host computers 102. A storage system management application 156 enables groups of storage volumes 140 to be grouped together into storage groups 200. In the example shown in FIG. 2, storage group $200_1$ includes storage volumes 140a and 140b, and storage group 2002 includes storage volumes 140c and 140d. A given storage group may contain many storage volumes 140 and are not limited to containing only two storage volumes 140.

In some embodiments, the storage system management application 156 is used to create snapshot policies 240, which are applied by the storage system management application 156 to one or more storage groups 200. The snapshot subsystem 160 interacts with operating system 150 to cause the operating system 150 to create snapsets 210 of storage volumes 140 of storage groups 200 in accordance with the snapshot policy definitions 240.

According to some embodiments, the snapshot subsystem 160 has a snapset ID generator 250. The snapset ID generator 250 generates a snapset ID 230 each time a snapset 210 is created, and causes the operating system 150 to associate the snapset ID 230 with each snapshot 220 created in connection with generation of the snapset 210. Thus, for example, if a storage group 200 includes 100 storage volumes 140, when the operating system 150 creates a snapset 210 of the storage volumes 140 of the storage group 200, the same snapset ID 230 will be associated with each of the 100 snapshots 220 of the snapset 210. By assigning a snapset ID 230 to each snapshot 220 of the snapset 210, it is possible to identify which snapshots 220 are associated with the snapset 210 at a later point in time. Thus, if a user wants to make use of one or more snapshots 220 associated with a particular snapset 210, or wants to delete all snapshots 220 associated with a particular snapset 230 or group of snapsets 230, it is possible to identify the snapshots 220 using the snapset ID 230 to ensure that the correct operations are being taken on the correct snapshots 220.

For example, in FIG. 2, a first snapset $210_1$ is shown as being created from the storage volumes 140a, 140b, of storage group $200_1$. The first snapset $210_1$ includes a first snapshot 220a of storage volume 140a, and a second snapshot 220b of storage volume 140b. Both snapshot 220a and 220b have been assigned the same snapset ID $230_1$. Similarly, a second snapset $210_2$ is shown as being created on the storage volumes 140c, 140d of storage group 2002. The second snapset $210_2$ includes a first snapshot 220c of storage volume 140c, and a second snapshot 220d of storage volume 140d. Both snapshot 220c and 220d have been assigned the same snapset ID 2302, which is unique within storage system 100 and different than the snapset ID $230_1$.

Figure 3:
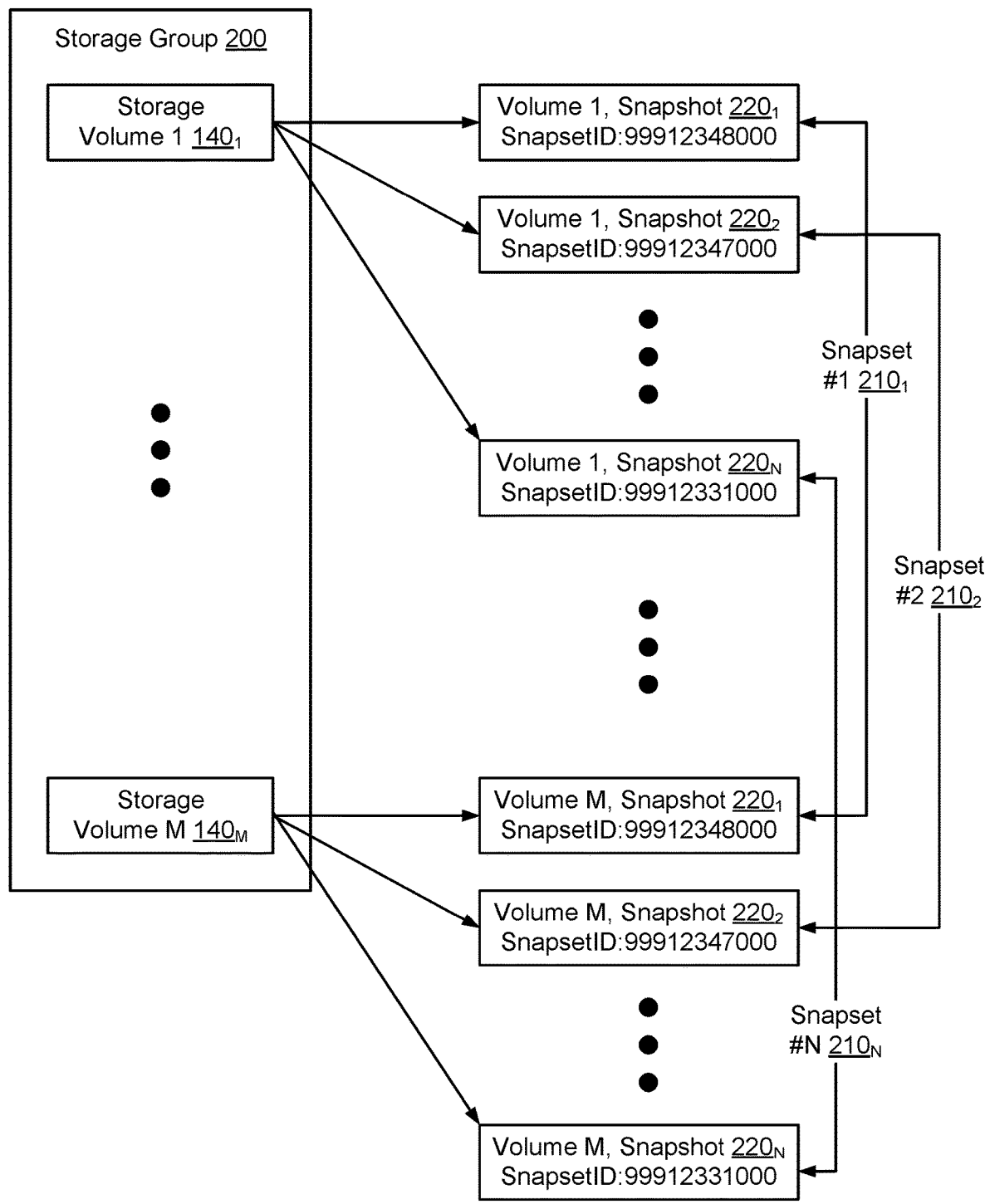
FIG. 3 is a functional block diagram of an example set of snapsets taken on a set of storage volumes forming a storage group, according to some embodiments.

FIG. 3 is a functional block diagram of an example set of snapsets $210_1$-$210_N$ taken on storage volumes $140_1$-$140_m$ of a storage group 200, according to some embodiments. In the example storage group 200 shown in FIG. 3, the storage group 200 includes a set of M storage volumes $140_1$-$140_m$. For convenience, only two of the storage volumes $140_1$ and $140_m$ are shown in FIG. 3. N snapsets $210_1$-$210_N$ have been taken on these M storage volumes $140_1$-$140_m$, which are labeled Snapset #1-Snapset #N. Only three of the snapsets $210_1$, $210_2$, and $210_N$ are shown in FIG. 3 for convenience.

A most recent snapset $210_1$ (snapset #1) includes a snapshot 220 of each of the storage volumes $140_1$-$140_m$ at a given point in time. Each snapshot 220 of the first snapset $210_1$ has been labeled the same SnapsetID, which in the illustrated example is SnapsetID: 99912348000. A previous snapset $210_2$ (snapset #2) includes a snapshot 220 each of the storage volumes $140_1$-$140_m$ at a previous point in time. Each snapshot 220 of snapset #2 has been labeled using SnapsetID: 99912347000. Snapset #N $210_N$ is the oldest snapset $210_N$ shown in FIG. 3, and includes a snapshot of each of the storage volumes $140_1$-$140_m$ that have been labeled using SnapsetID: 99912331000.

In some embodiments, the snapset ID 230 is a monotonically increasing value within the storage system that is assigned across all snapsets of all storage groups. In some embodiments (See FIG. 4), the snapset ID 230 is a high-resolution timestamp, such as a 64 bit timestamp, that is based on a time of creation of the snapset. The snapset ID values represent the time (from the point of view of the storage system 100) when IO operations on the set of storage volumes 140 of the storage group 200 were paused to enable the snapshots of the storage volumes to be created. In some embodiments, larger snapshot ID values correspond to snapshots taken after snapshots with smaller snapshot ID values. Alternatively (See FIG. 9), the snapset ID 230 may be a monotonously increasing sequential value that is incremented each time a snapset is created on one of the storage groups of the storage system. In either instance, each snapset ID 230 is globally unique across all snapsets on the storage system.

The snapset ID 230 remains the same throughout the life of the snapshot. Accordingly, the snapset ID 230 is an absolute value that remains the same regardless of creation or deletion of other snapshot generations. When a snapset 210 is taken on the storage volumes of a storage group, individual snapshots are created on each of the storage volumes 140 of the storage group 200. The same snapset ID 230 is assigned to each of the snapshots 220 of that snapset 210.

In some embodiments, the storage system management application enables the user to issue list/report operations on the snapshot subsystem 160 to obtain lists of snapsets or snapshots. For example, the user can request that a list of snapshots associated with a unique snapset ID 230 be provided, request a list of snapsets 210 on a given storage group 200 be provided, request all snapsets 210 having a snapset ID 230 older than a particular value be provided, or otherwise cause lists of snapsets 210 and lists of snapshots to be provided. Additionally, in some embodiments, the storage system management application 156 enables the user to implement control operations on the snapshots by specifying operations that should be applied to snapshots associated with particular snapset IDs 230 or ranges of snapset IDs 230. For example, the user could cause all snapshots with a particular snapset ID 230 to be deleted, cause all snapshots with a snapset ID 230 less than a particular value to be deleted, or cause all snapshots having a particular snapset ID 230 be linked to thin devices and presented to an application 104. Many operations may be taken by identifying snapshots using the snapset ID 230 depending on the implementation, and these are merely a few such operations. Control operations include individual control operations on individual snapshots or snapsets of a particular storage group, and collective control operations that apply to snapshots or snapsets of multiple storage groups.

Figure 4:
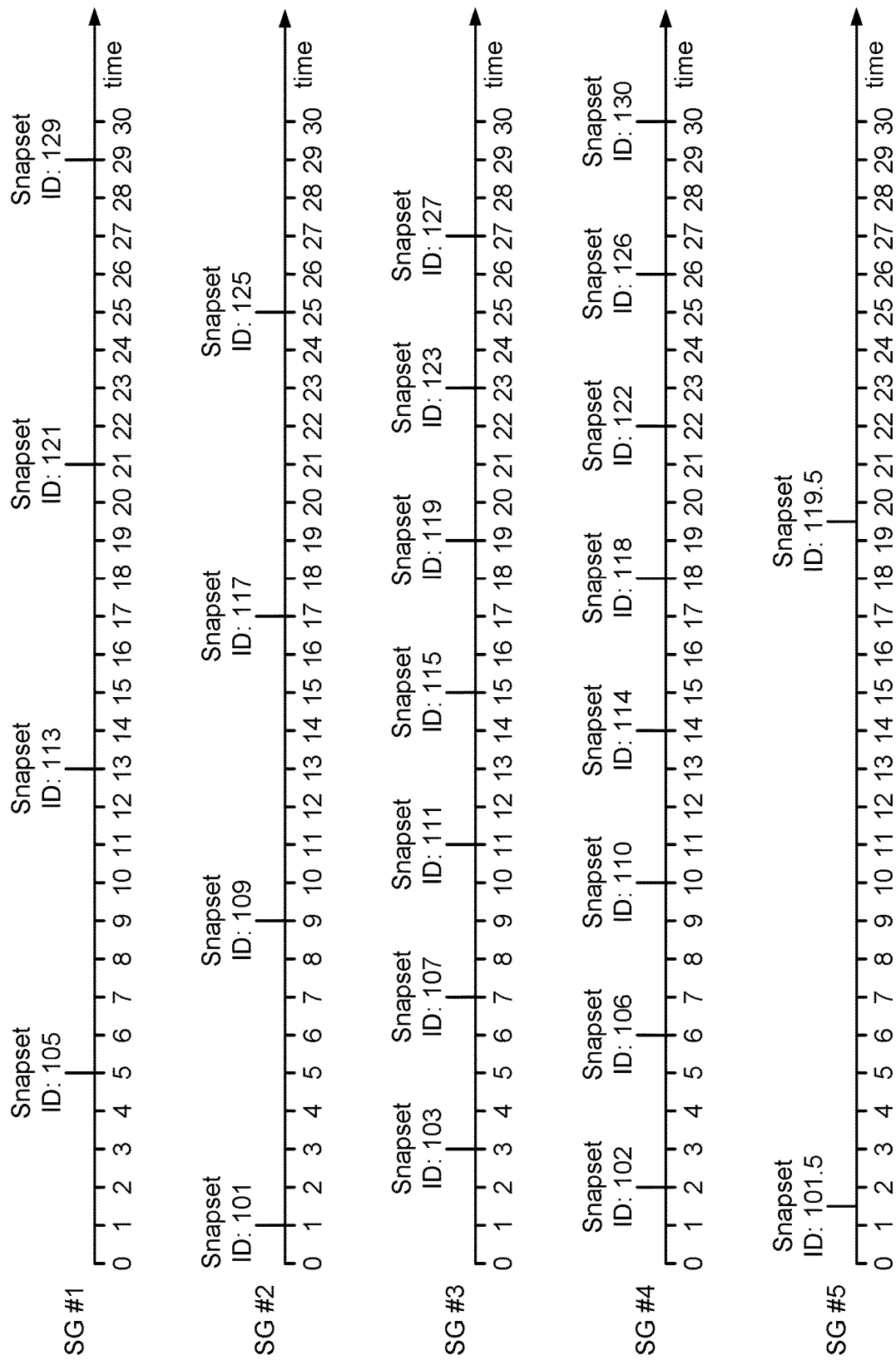
FIG. 4 is a set of timelines showing creation of snapsets on storage groups and assignment of snapset IDs to the snapsets based on high resolution timestamps, according to some embodiments.

FIG. 4 is a set of timelines showing creation of snapsets 210 on storage volumes 140 of storage groups 200 and assignment of snapset IDs 230 to the snapshots 220 of the snapsets 210 based on high resolution timestamps, according to some embodiments. In FIG. 4 there are five storage groups 200, labeled SG #1, SG #2, SG #3, SG #4, and SG #5. Snapset policies 240 dictate how frequently snapsets 210 should be taken on each of the storage groups 200. Each timeline is labeled from 0-30. The intervals may be minutes, hours, days, or other time intervals. For purposes of this description and ease of understanding, FIGS. 4, 5, 6, and 9 will be described using hours as the time intervals.

In FIG. 4, the snapshot policies 240 currently being applied to storage groups SG #1 and SG #2 both specify that a snapset 210 will be taken on those storage groups every 8 hours. However, the snapsets 210 are offset from each other by four hours. The snapset policies 240 currently being applied to storage groups SG #3 and SG #4 both specify that a snapset 210 should be taken on those storage groups every four hours. However, the snapset policies 240 are offset from each other by one hour. In FIG. 4 there is no snapshot policy 240 currently applied to storage group SG #5. Rather, snapsets 210 on that storage group (storage group SG #5) are manually created by the user at user-determined intervals.

As shown in FIG. 4, each snapset 210 is assigned a snapset ID 230 as it is created. The snapset IDs 230 monotonically increase across all storage groups 200 and are not specific to particular storage groups. Specifically, looking from left to right in FIG. 4, the oldest snapset 210, which was created on storage group SG #2 at hour 1, has been assigned snapset ID:101. The next subsequent snapset 210 was manually created on storage group SG #5 at hour 1.5 and has been assigned a snapset ID:101.5. Each of the subsequent snapsets 210 has been assigned a subsequent snapset ID 230, such that the 25th snapset 210, which was created on storage group SG #4 at hour 30, has been assigned snapset ID:130. As shown in FIG. 3, when a snapset ID 230 is assigned to a snapset 210, it is applied to all snapshots 220 associated with the snapset 210, such that each snapshot 220 of the snapset 210 is labeled using the same snapset ID 230.

Figure 9:
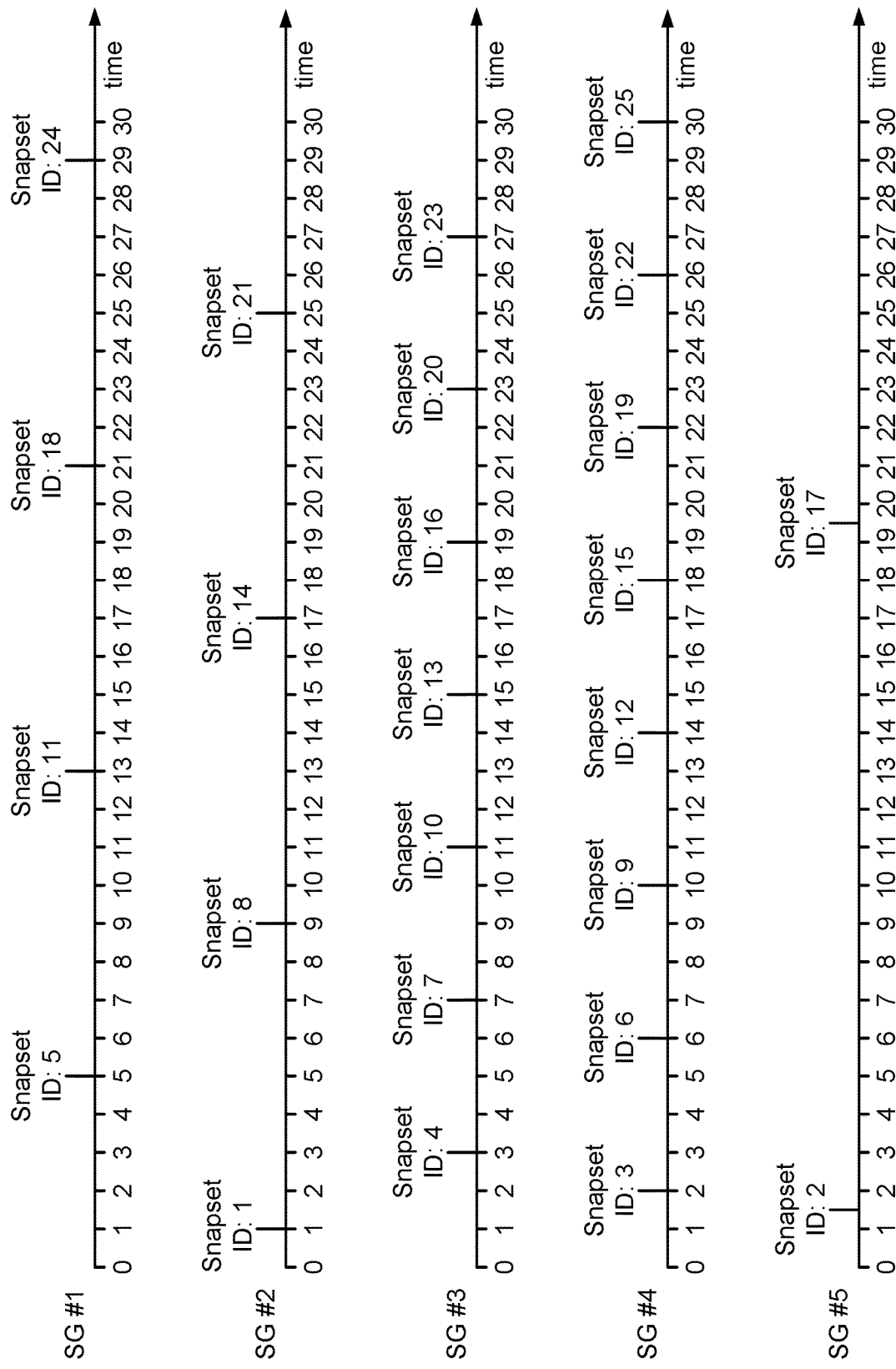
FIG. 9 is a set of timelines showing creation of snapsets on storage groups and assignment of snapset IDs to the snapsets based on monotonically sequentially increasing snapset ID values across all storage groups of the storage system, according to some embodiments.

Although FIG. 4 shows snapset IDs 230 correlating to the time of creation of the snapset 210, as shown in FIG. 9, in some embodiments the snapset ID 230 is a monotonically increasing sequential value applied across all storage groups 200 such that each snapset 210 is sequentially numbered as it is created, e.g. snapsets are numbered 1, 2, 3, 4, etc. In this implementation, the snapset IDs 230 are not based on the time of creation of the snapset 210, but rather are sequential values across all storage groups 200 of the storage system 100, and are implemented by assigning a new snapset ID 230 based on the snapset ID 230 of a previously created snapset 210 plus 1: Snapset $ID_N$=Snapset $ID_{N-1}$+1. Although assignment of a snapset ID 230 in this manner provides an indication of an order of snapset creation, it is different than a timestamp in that it does not strictly identify when a snapset 210 was created.

Figure 5:
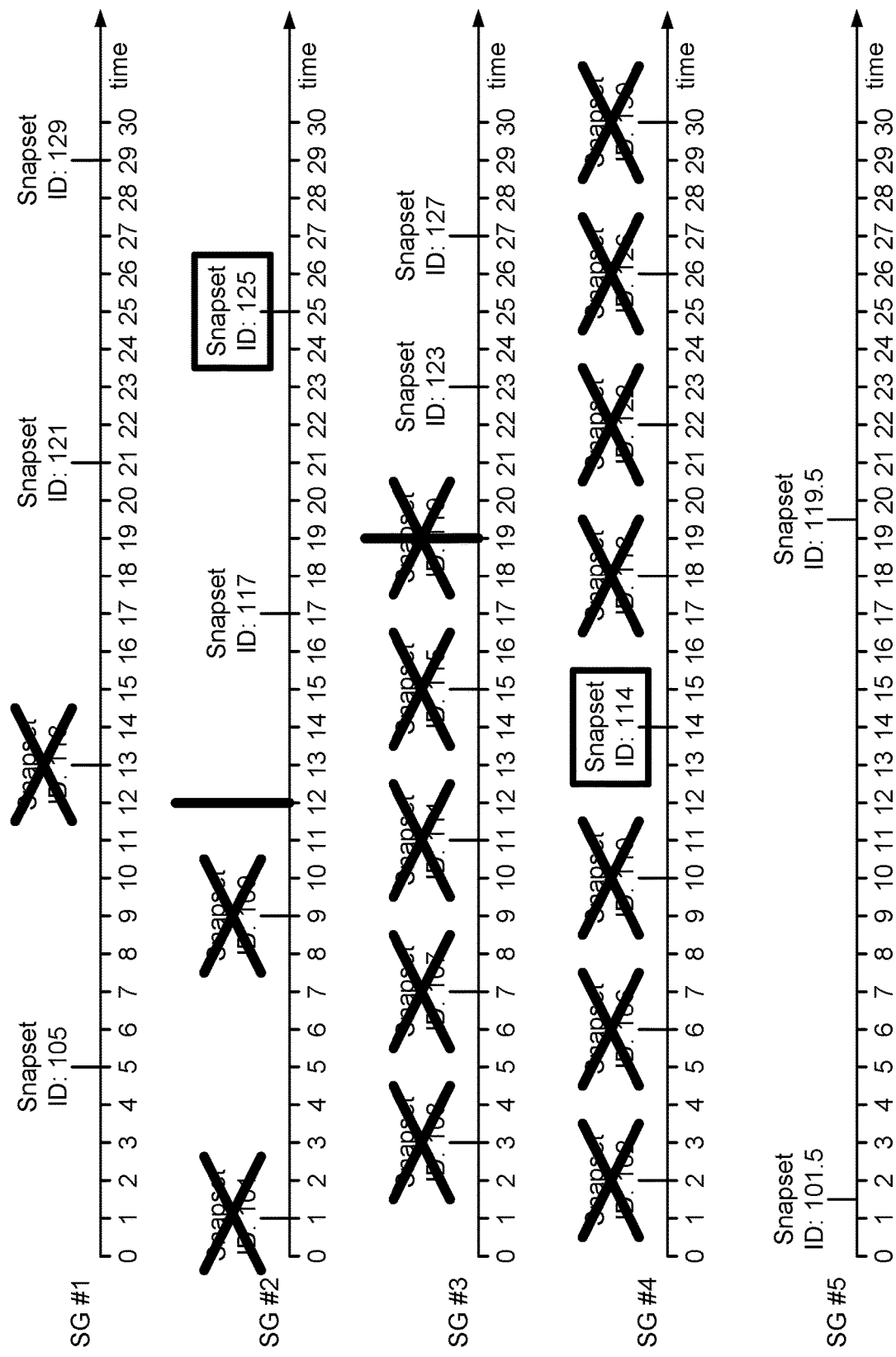
FIG. 5 is a set of timelines showing implementation of individual control operations on snapsets of individual several storage groups, according to some embodiments.

FIG. 5 shows a selection of individual operations that may be taken on snapsets 210 of individual storage groups 200 by specifying actions to be taken according to snapset ID 230. For example, as shown in connection with storage group SG

1, it is possible to instruct the storage system 100 to delete all snapshots 220 associated with a particular snapset ID 230, in this case snapset ID:113, while keeping all other snapsets 210 that were created on that storage group 200. It is also possible to instruct the storage system to make use of the snapshots having a particular snapset ID, such as to query the storage system for snapshots having the particular snapset ID, link the snapshots having the particular snapset ID to target volumes, restore from snapshots having the particular snapset ID, or otherwise use the snapshots associated with the particular snapset ID.

As shown in connection with storage group SG #2, it is possible to instruct the storage system 100 to delete all snapsets 210 having a snapset ID 230 lower than a particular value (e.g. having a snapset ID<ID:112), and to make use of the snapset 210 having snapset ID:125. As shown in connection with storage group SG #3, it is also possible to simply delete all snapsets 210 having a snapset ID less than or less than or equal to a particular value. In connection with the example shown in FIG. 5, the instruction was to delete all snapsets 210 on a storage group SG #3 having a snapset ID 119. For storage group SG #4, the instruction was to make use of the snapset 210 with snapset ID:114 and delete all other snapsets 210. No delete operations were taken on storage group #5, in this example.

Figure 6:
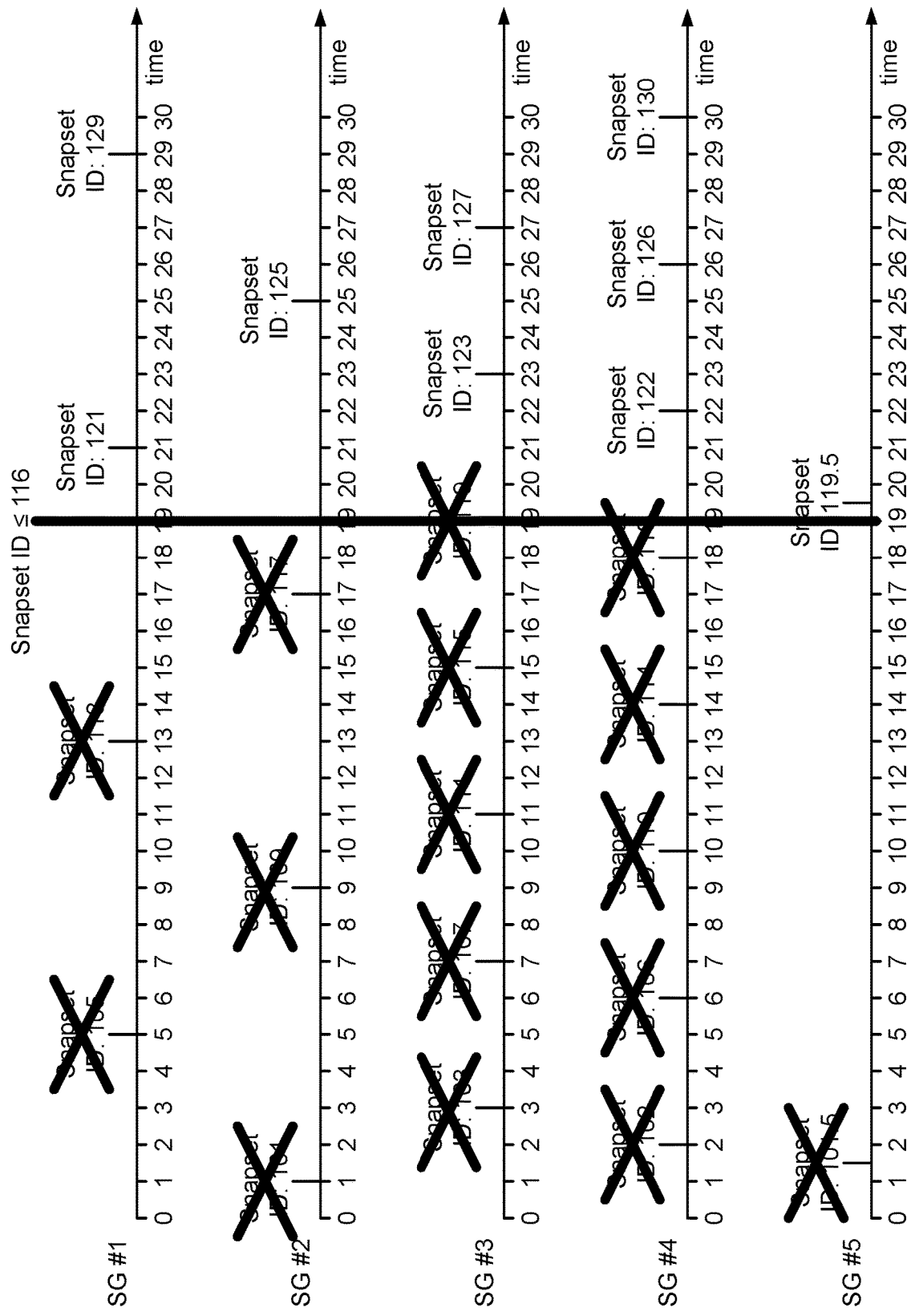
FIG. 6 is a set of timelines showing implementation of a collective control operation on snapsets associated with multiple storage groups, according to some embodiments.

It is also possible to take collective control operations on the storage system that apply to multiple storage groups or across all storage groups. For example, as shown in FIG. 6, it is possible to instruct the storage system 100 to delete all snapsets 210 of all storage groups 200 that have a snapset ID 230 lower than a particular value. In the illustrated example, the instruction is to delete all snapsets 210 with a snapset ID 119.

Figure 7:
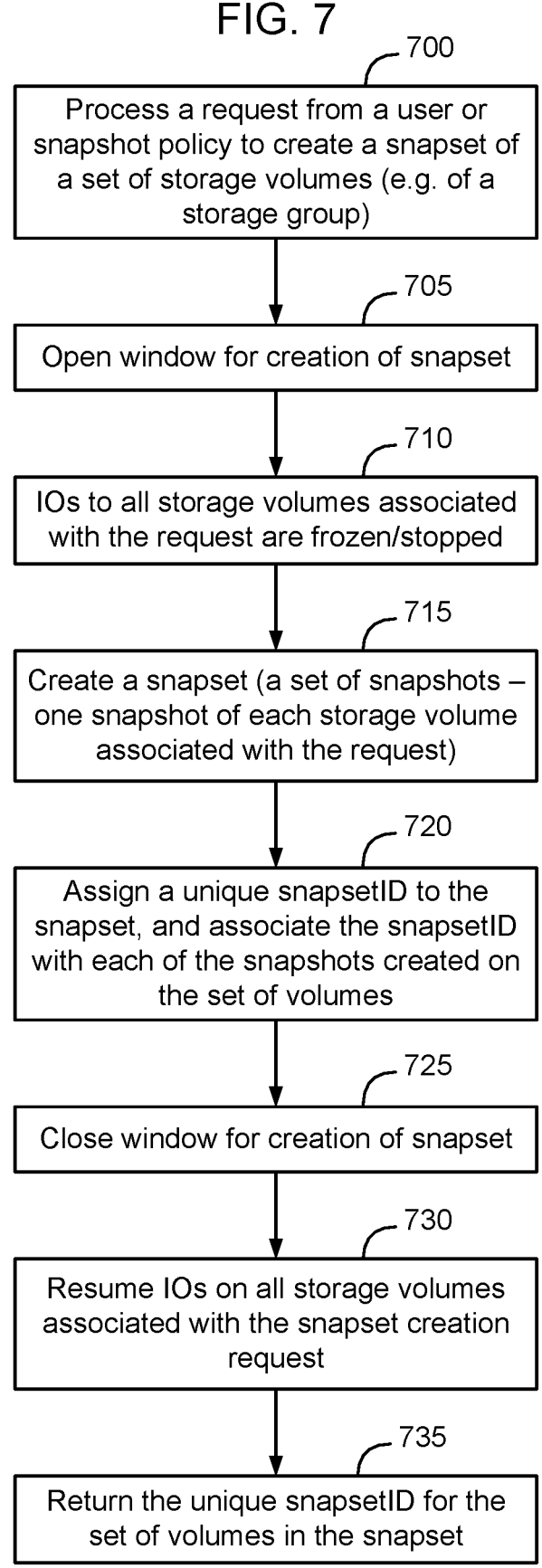
FIGS. 7 and 8 are flow charts of example methods of deterministically identifying sets of snapshots on a storage system, according to some embodiments.
Figure 8:
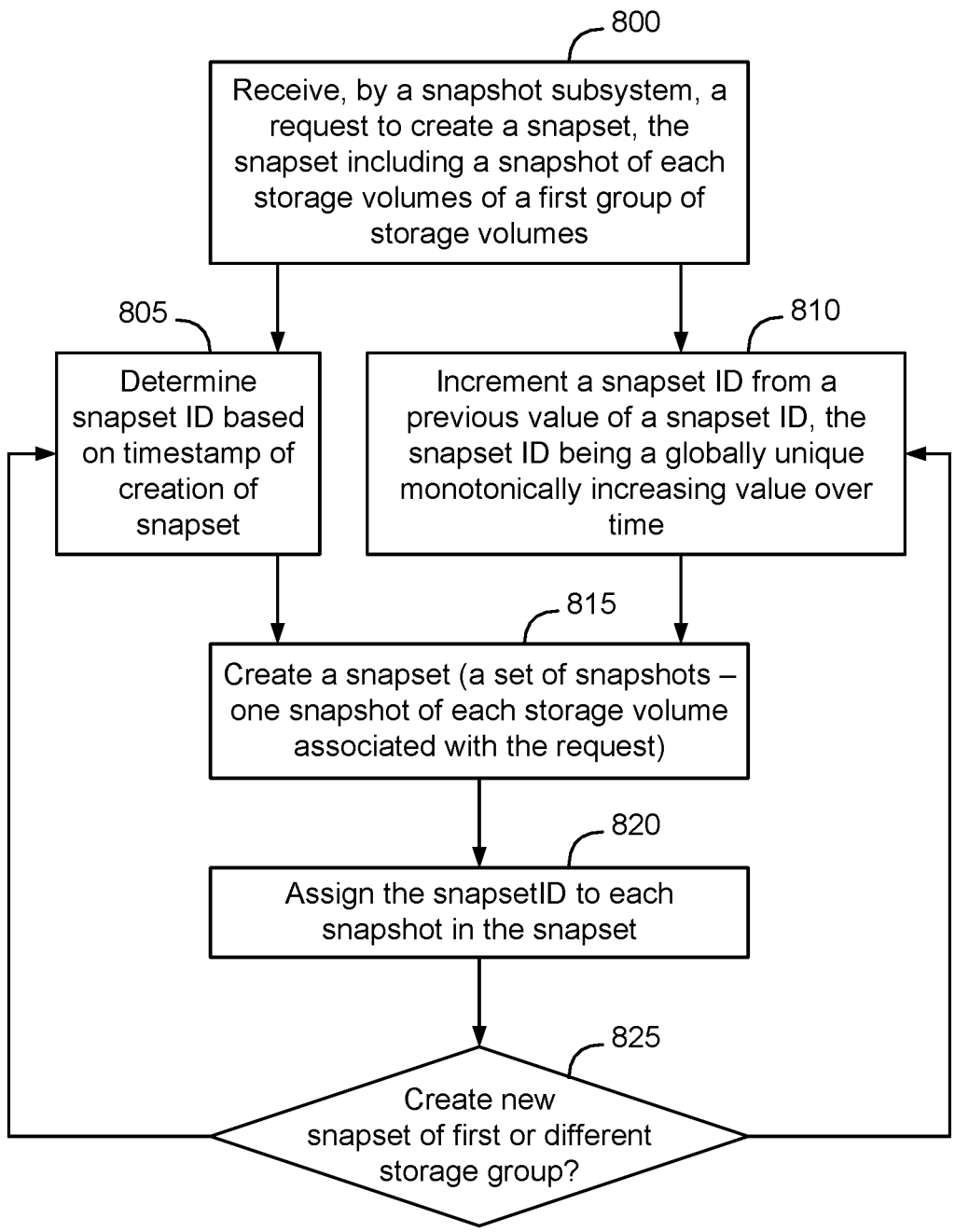

FIGS. 7 and 8 are flow charts of example methods of deterministically identifying sets of snapshots on a storage system, according to some embodiments. FIG. 7 shows an example process implemented by a storage system 100 in connection with creation of a particular snapset 210 on a set of storage volumes of a storage group. Creation of a snapset 210 may occur automatically based on implementation of a snapshot policy 240 or on demand upon receipt of a request from a user.

As shown in FIG. 7, when the storage system receives a request from a user to create a snapshot or when a snapshot policy 240 indicates that a snapset 210 should be created (block 700) a data service layer of the storage system 100 will open a window for creation of the snapset 210 (block 705). Opening of the window by the data service layer ensures that the snapset 210 includes a consistent set of data across the set of storage volumes 140, by causing all IO operations to all storage volumes 140 associated with the request to be frozen/stopped (block 710). Once IO operations on the storage volumes 140 have quiesced, a snapset 210 is created (block 715). The snapset 210 includes a set of snapshots 220—one snapshot 220 of each storage volume 140 in the storage group 200 associated with the request. Each snapshot 220 is a point in time copy of the data that was contained in the storage volume 140 at the point in time where IO operations were stopped on the storage group 200.

A unique snapset ID 230 is assigned to the snapset 210, and the unique snapset ID 230 is associated with each of the snapshots 220 created on the set of storage volumes 140 of the storage group 200 (block 720). By associating the same unique snapset ID 230 with each of the snapshots 220 of the snapset 210, it is possible to deterministically identify sets of snapshots 220 within the storage system 100 that are associated with each snapset 210 created by the storage system 100.

After the snapset 210 has been created and the snapset ID 230 has been associated with each snapshot 220 of the snapset 210, the data services layer closes the window (block 725) which enables IO operations to resume on all storage volumes 140 of the storage group 200 associated with the request (block 730). The snapset ID 230 that was assigned to the snapshots 220 of the snapset 210 is then returned to the storage system management application 156 (block 735) so that the storage system management application 156 can use the snapset ID 230 in connection with issuing control operations on the snapshot subsystem 160 to specify actions to be implemented on particular snapshots and snapsets 210. Example control operations include deleting individual snapshots 220, making use of individual snapshots 220, deleting all snapshots 220 associated with the snapset 210, making use of all snapshots 220 associated with the snapset 210, or other desired actions.

FIG. 8 is a flow chart showing an example process of incrementing the snapset ID in connection with creating snapsets 210 on multiple storage groups 200, according to some embodiments. As shown in FIG. 8, the process starts with the storage system 100 receiving a request to create a snapset 210 on a particular storage group 200 (block 800). In some embodiments the request is implemented by a snapshot subsystem 160, although the particular mechanism configured to implement creation of a snapset 210 within the storage system 100 will depend on the particular implementation. As shown in FIG. 8, the snapset 210 in some embodiments includes a snapshot 110 of each storage volume 140 of a first group of storage volumes 140 that form a storage group 200.

In connection with creating the snapset 210 on the first storage group 200, a snapshot ID 230 is generated to be applied to snapshots 220 of the snapset 210. For example, in embodiments where the snapset ID 230 is based on a timestamp (See FIG. 4), a snapset ID 230 may be determined based on the timestamp of creation of the snapset 210 (block 805). In embodiments where the snapset 210 is a monotonically increasing sequential value across the set of storage groups 200 of the storage system 100 (See FIG. 9), the snapset ID 230 may be determined by incrementing the snapset ID 230 from a previous value of a snapset ID 230 applied to an immediately previously created snapset 210 (block 810). In either instance, the determined snapset ID 230 is a globally unique value within the storage system 100 and is determined in such a manner that snapshots 220 of different snapsets 230 are guaranteed to not be assigned the same snapset ID 230.

The storage system 100 then creates the snapset 210 (block 815) such that the snapset 210 includes a set of snapshots 220—one snapshot 220 of each storage volume 140 of the storage group 200 on which the snapset 210 is to be created. In connection with creation of the snapshots 220, the snapset ID 230 is assigned to each snapshot 220 of the snapset 210 (block 820).

When the storage system 100 receives a request to create a new snapset 210 on the first storage group 200 or on another storage group 200 within the storage system 100 (block 825) the process returns to block 805 or block 810, depending on the manner in which snapset IDs 230 are being determined, and assigns a different snapset ID 230 to the next snapset 210.

On a large storage system 100, the number of snapshots 220 that can be created on storage volumes 140 can run into the millions. Managing snapshots 220 at such large-scale using snapshot generation name was not easy and could be non-deterministic. By using snapset IDs 230 to identify snapshots 220 associated with a given snapset 210, it is possible to provide a deterministic way of identifying snapshots 220 on the storage system 100. For example, if a storage group 200 includes 100 storage volumes 140, and a snapset 210 is created on the storage volumes of the storage group 200, there will be 100 snapshots in the resulting snapset 210. Each of these snapshots 220 is associated with the assigned snapset ID 230, to thereby enable the group of snapshots 220 to be uniquely identified within the storage system 100. After the snapshots 220 with the particular snapset ID 230 are created, users can start using them by specifying that particular actions should be taken on snapshots 220 having a particular snapset ID 230 or range of snapset ID values. For example, a user can terminate all snapshots 220 having a snapset ID 230 older than a specified snapset ID value. This greatly simplifies management of snapshots within a storage system 100 and makes it easier to manage usage of storage resources of the storage system 100.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified nouns, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of deterministically identifying sets of snapshots in a storage environment, the computer program including a set of instructions which, when executed by a computer, cause the computer to perform a method comprising the steps of:
periodically creating snapsets of sets of storage volumes organized as storage groups in storage resources of a storage system, each snapset including a snapshot of each respective storage volume of a respective storage group;
assigning a respective snapset ID to each of the snapsets, each snapset ID being assigned to a single snapset, being monotonically increasing, and being a globally unique value across all snapsets within the storage system;
associating the respective snapset ID with each of the snapshots of the respective snapset; and
providing the snapset IDs to a storage system management application;
using the snapset IDs, by the storage system management application, to deterministically identify snapshots associated with the snapset IDS and to take collective control operations on the storage system that apply to multiple storage groups by specifying operations that are applied to ranges of snapset IDs.

2. The non-transitory tangible computer readable storage medium of claim 1, wherein the snapset ID is a high-resolution timestamp based on a time of creation of the respective snapset.

3. The non-transitory tangible computer readable storage medium of claim 1, wherein the snapset ID is a monotonically increasing sequential number across all storage groups.

4. The non-transitory tangible computer readable storage medium of claim 1, further comprising maintaining the snapset IDs within the storage system as constant values that do not change over time.

5. The non-transitory tangible computer readable storage medium of claim 1, wherein each snapset includes a set of snapshots that are created from storage volumes of the storage group based on data that existed in the storage volumes at a particular point in time.

6. The non-transitory tangible computer readable storage medium of claim 1, wherein the step of periodically creating snapsets of sets of storage volumes, comprises:
quiescing IO operation on a respective set of storage volumes;
creating snapshots of each of the storage volumes while 10 operations are quiesced; and
resuming IO operations on the respective set of storage volumes after creation of the snapshots.

7. The non-transitory tangible computer readable storage medium of claim 1, further comprising implementing control operations on the snapsets by the storage system management application based only on the values of the snapset IDs.

8. The non-transitory tangible computer readable storage medium of claim 7, wherein one of the control operations comprises deleting all snapsets of storage volumes of a particular storage group having snapset ID values lower than a first snapset ID value.

9. The non-transitory tangible computer readable storage medium of claim 7, wherein one of the control operations comprises deleting all snapsets of storage volumes of multiple storage groups having snapset ID values lower than a first snapset ID value.

10. The non-transitory tangible computer readable storage medium of claim 7, wherein one of the control operations comprises making use of a particular snapset of storage volumes of a particular storage group having a snapset ID value equal to a first value.

11. The non-transitory tangible computer readable storage medium of claim 10, wherein making use of the particular snapset comprises linking the snapshots of the snapset to target volumes.

12. The non-transitory tangible computer readable storage medium of claim 7, wherein one of the control operations comprises querying for snapsets of storage volumes of a particular storage group to determine snapset ID values of existing snapsets on the storage system.

13. A method of deterministically identifying sets of snapshots in a storage environment, comprising:
   periodically creating snapsets of sets of storage volumes organized as storage groups in storage resources of a storage system, each snapset including a snapshot of each respective storage volume of a respective storage group;
   assigning a respective snapset ID to each of the snapsets, each snapset ID being assigned to a single snapset, being monotonically increasing, and being a globally unique value across all snapsets within the storage system;
   associating the respective snapset ID with each of the snapshots of the respective snapset; and
   providing the snapset IDs to a storage system management application;
   using the snapset IDs, by the storage system management application, to deterministically identify snapshots associated with the snapset IDS and to take collective control operations on the storage system that apply to multiple storage groups by specifying operations that are applied to ranges of snapset IDs.

14. The method of claim 13, wherein the snapset ID is a high-resolution timestamp based on a time of creation of the respective snapset.

15. The method of claim 13, wherein the snapset ID is a monotonically increasing sequential number across all storage groups.

16. The method of claim 13, further comprising maintaining the snapset IDs within the storage system as constant values that do not change over time.

17. The method of claim 13, further comprising implementing control operations on the snapsets by the storage system management application based only on the values of the snapset IDs.

18. The method of claim 17, wherein one of the control operations comprises deleting all snapsets of storage volumes of a particular storage group having a snapset ID value lower than a first value.

19. The method of claim 17, wherein one of the control operations comprises deleting all snapsets of storage volumes of multiple storage groups having snapset ID values lower than a first snapset ID value.

20. The method of claim 17, wherein one of the control operations comprises making use of a particular snapset of storage volumes of a particular storage group having a snapset ID value lower than a first snapset ID value.

* * * * *

UNITED STATES PATENT AND TRADEMARK OFFICE
CERTIFICATE OF CORRECTION

| | | |
|---|---|---|
| PATENT NO. | : 11,762,807 B2 | Page 1 of 1 |
| APPLICATION NO. | : 17/154332 | |
| DATED | : September 19, 2023 | |
| INVENTOR(S) | : John Copley et al. | |

It is certified that error appears in the above-identified patent and that said Letters Patent is hereby corrected as shown below:

In the Claims

Column 14 Line 48, change "10" to --IO--.

Signed and Sealed this
Twenty-fourth Day of October, 2023

Katherine Kelly Vidal
*Director of the United States Patent and Trademark Office*